United States Patent
Teshima et al.

(10) Patent No.: US 12,414,068 B2
(45) Date of Patent: Sep. 9, 2025

(54) MANAGEMENT NODE, DISTRIBUTED UNIT, RADIO COMMUNICATION SYSTEM, AND RADIO COMMUNICATION METHOD

(71) Applicant: NTT DOCOMO, INC., Tokyo (JP)

(72) Inventors: Kunihiko Teshima, Tokyo (JP); Daisuke Hiratsuka, Tokyo (JP); Takuto Arai, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 331 days.

(21) Appl. No.: 17/758,943

(22) PCT Filed: Jan. 17, 2020

(86) PCT No.: PCT/JP2020/001544
§ 371 (c)(1),
(2) Date: Nov. 18, 2022

(87) PCT Pub. No.: WO2021/144972
PCT Pub. Date: Jul. 22, 2021

(65) Prior Publication Data
US 2023/0239824 A1    Jul. 27, 2023

(51) Int. Cl.
*H04W 56/00*    (2009.01)
*H04W 88/08*    (2009.01)

(52) U.S. Cl.
CPC ..... *H04W 56/0055* (2013.01); *H04W 56/003* (2013.01)

(58) Field of Classification Search
CPC ..... H04W 8/00–265; H04W 16/24–32; H04W 88/08–188
See application file for complete search history.

(56) References Cited

U.S. PATENT DOCUMENTS

| | | | |
|---|---|---|---|
| 2019/0245740 A1* | 8/2019 | Kachhla | H04L 41/082 |
| 2019/0254047 A1* | 8/2019 | Ahmed | H04W 88/085 |
| 2021/0136790 A1* | 5/2021 | Bidkar | H04W 72/569 |
| 2022/0159525 A1* | 5/2022 | Chou | H04W 36/22 |

FOREIGN PATENT DOCUMENTS

| | | |
|---|---|---|
| JP | 2019012937 A | 1/2019 |
| WO | 2017215437 A1 | 12/2017 |

OTHER PUBLICATIONS

ORAN-WG4.CUS.0-v02.00; "O-RAN Fronthaul Working Group Control, User and Synchronization Plane Specification"; Aug. 2019 (218 pages).

(Continued)

*Primary Examiner* — San Htun
(74) *Attorney, Agent, or Firm* — Osha Bergman Watanabe & Burton LLP

(57) ABSTRACT

A communication device constitutes a management node that manages at least one of a first base station and a second base station provided on fronthaul. The communication device includes an acquisition unit that acquires a delay profile of the second base station, a control unit that determines a window parameter used to specify at least one of a Reception window and a Transmission window used in the first base station based on the delay profile of the second base station and a delay parameter defined by the fronthaul, and a notification unit that notifies the first base station of the window parameter.

7 Claims, 14 Drawing Sheets

(56) References Cited

OTHER PUBLICATIONS

International Search Report for corresponding International Application No. PCT/JP2020/001544, mailed Aug. 25, 2020 (3 pages).
Written Opinion for corresponding International Application No. PCT/JP2020/001544, mailed Aug. 25, 2020 (3 pages).
Office Action issued in the counterpart Chilean Application No. 2022-01919, mailed Feb. 23, 2024 (26 pages).
Examination Report issued in counterpart Indian Application. No. 202217045440, mailed Mar. 19, 2024 (7 pages).
Office Action issued in counterpart Japanese Application No. 2021-570610, mailed Feb. 20, 2024 (7 pages).
Anil Umesh et al, "Overview of O-RAN Fronthaul Specifications", NTT Docomo Technical Journal vol. 21. No. 1, Jul. 2019 (14 pages).
U. Anneal et al. "Outline of RAN Fronthaul Specifications" NTT DOCOMO Technical Journal, vol. 27, No. 1; Apr. 2019 (26 pages).
A. Umesh et al. "Overview of O-RAN Fronthaul Specifications" NTT DOCOMO Technical Journal vol. 21, No. 1; Jul. 2019 (14 pages).
Extended European Search Report issued in European Application No. 20914135.7, dated Aug. 30, 2023 (10 pages).
Office Action issued in Japanese Application No. 2021-570610; dated Sep. 19, 2023 (8 pages).
Office Action issued in the counterpart Chilean Application No. 202201919, mailed Nov. 18, 2024 (33 pages).
Office Action issued in Japanese Patent Application No. 2021-570610, dated Aug. 26, 2024 (3 pages).
Office Action issued Chinese Patent Application No. 202080091865.7, dated Sep. 2, 2024 (12 pages).
Office Action issued in Chinese Patent Application No. 202080091865.7, mailed Apr. 21, 2025 (15 pages).
Office Action issued in Korean Patent Application No. 10-2022-7024825, mailed Apr. 29, 2025 (9 pages).

* cited by examiner

FIG.10

```
| +--ro ru-delay-profile
|    +--ro t2a-min-up        uint32
|    +--ro t2a-max-up        uint32
|    +--ro t2a-min-cp-dl     uint32
|    +--ro t2a-max-cp-dl     uint32
|    +--ro tcp-adv-dl        uint32
|    +--ro ta3-min           uint32
|    +--ro ta3-max           uint32
|    +--ro t2a-min-cp-ul     uint32
|    +--ro t2a-max-cp-ul     uint32
```

FIG.11

```
| +--rw O-DU-delay-profile
|    +--rw t1a-min-up        uint32
|    +--rw t1a-max-up        uint32
|    +--rw t1a-min-cp-dl     uint32
|    +--rw t1a-max-cp-dl     uint32
|    +--rw ta4-min           uint32
|    +--rw ta4-max           uint32
|    +--rw t1a-min-cp-ul     uint32
|    +--rw t1a-max-cp-ul     uint32
```

MANAGEMENT NODE, DISTRIBUTED UNIT, RADIO COMMUNICATION SYSTEM, AND RADIO COMMUNICATION METHOD

TECHNICAL FIELD

The present invention relates to a communication device corresponding to a fronthaul interface.

BACKGROUND ART

Open O-radio radio access network (O-RAN) Alliance is established for the purpose of promoting openness and intelligentization of a radio access network (RAN) in the 5G era, and many operators/vendors join the O-RAN Alliance and are discussing the openness and intelligentization.

Multiple architectures are being discussed in the O-RAN, and as one of the architectures, an open fronthaul (FH) interface that realizes interconnection between a baseband processing unit and a radio unit between different vendors has been discussed.

Specifically, in the O-RAN, an O-RAN distributed unit (O-DU) and an O-RAN radio unit (O-RU) as a function group which performs layer 2 function, baseband signal processing, and radio signal processing have been defined, and an interface between the O-DU and the O-RU has been discussed.

The O-DU is a logical node that mainly hosts a radio link control layer (RLC), a medium access control layer (MAC), and a PHY-High layer based on a lower layer function. The O-RU is a logical node that hosts a PHY-low layer and RF processing based on functional division of lower layers.

In the O-RAN, strict timing accuracy is required because function sharing points of the O-DU/O-RU are arranged in a physical (PHY) layer. Therefore, FH delay management is performed, and a Transmission window and a Reception window have been used as the method (Non Patent Literature 1).

CITATION LIST

Non Patent Literature

Non Patent Literature 1: "ORAN-WG4. CUS.0-v02.00", O-RAN Fronthaul Working Group, Control, User and Synchronization Plane Specification, O-RAN Alliance, August 2019

SUMMARY OF INVENTION

In recent years, assuming a case where the O-DU/O-RU is provided by different vendors/operators, a network management system (NMS) that manages the O-DU/O-RU provided by different vendors has been studied.

However, functions that the NMS should perform in the delay management of the FH have not been clarified, and therefore, it is necessary to clarify the functions.

Therefore, the present invention has been made in view of such a situation, and an object of the present invention is to provide a communication device capable of appropriately performing delay management of fronthaul (FH) using an NMS.

According to an aspect of the present disclosure, a communication device that constitutes a management node managing at least one of a first base station and a second base station provided on fronthaul includes an acquisition unit that acquires a delay profile of the second base station, a control unit that determines a window parameter used to specify at least one of a Reception window and a Transmission window used in the first base station based on the delay profile of the second base station and a delay parameter defined by the fronthaul, and a notification unit that notifies the first base station of the window parameter.

According to an aspect of the present disclosure, a communication device that constitutes a first base station communicating with a second base station on fronthaul includes an acquisition unit that acquires a window parameter used to specify at least one of a Reception window and a Transmission window used in the first base station from a management node managing at least one of the first base station and the second base station, and a control unit that configures at least one of the Reception window and the Transmission window based on the window parameter, in which the window parameter is determined in the management node based on a delay profile of the second base station and a delay parameter defined by the fronthaul.

According to an aspect of the present invention, a communication device that constitutes a first base station communicating with a second base station on fronthaul includes an acquisition unit that acquires a delay profile of the second base station from the second base station and acquires a delay parameter defined by the fronthaul from a management node managing at least one of the first base station and the second base station, and a control unit that configures at least one of a Reception window and a Transmission window used in the first base station based on the delay profile of the second base station and the delay parameter.

According to an aspect of the present disclosure, a communication device that constitutes a management node managing at least one of a first base station and a second base station provided on fronthaul includes a notification unit that notifies the first base station of a delay parameter defined by the fronthaul, in which the delay parameter is used to configure at least one of the Reception window and the Transmission window used in the first base station together with a delay profile of the second base station.

BRIEF DESCRIPTION OF DRAWINGS

FIG. 10 is a diagram illustrating an example of an O-RU delay profile according to an embodiment.

FIG. 11 is a diagram illustrating an example of a window parameter according to an embodiment.

DESCRIPTION OF EMBODIMENTS

Figure 1:
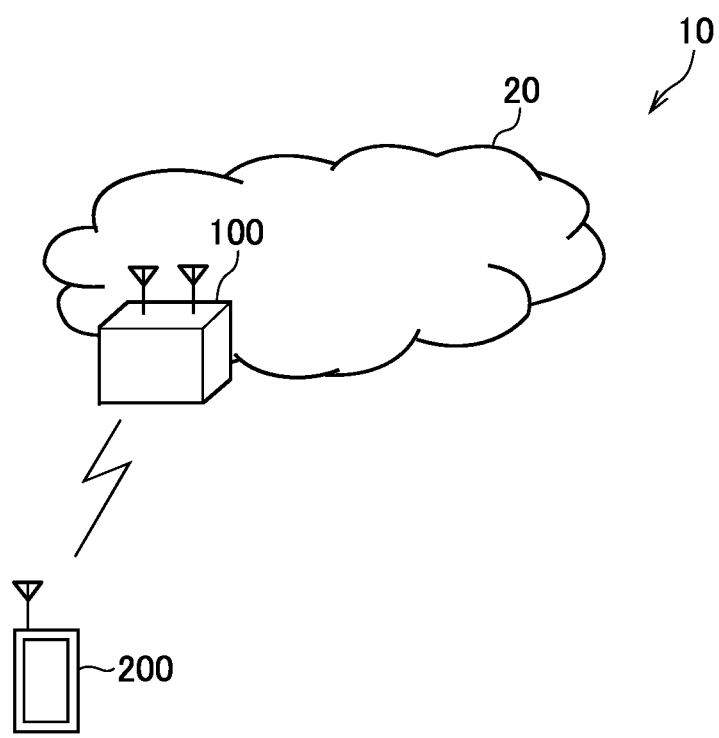
FIG. 1 is an overall schematic configuration diagram of a radio communication system 10 according to an embodiment.

Hereinafter, embodiments will be described with reference to the drawings. Note that the same functions or configurations will be denoted by the same or similar reference numerals, and a description thereof will be appropriately omitted.

EMBODIMENTS (1) Overall Schematic Configuration of Radio Communication System FIG. 1 is an overall schematic configuration diagram of a radio communication system 10 according to an embodiment. In the embodiment, a radio communication system 10 is a radio communication system according to 5G new radio (NR), and includes a Next Generation-Radio Access Network 20 (hereinafter, referred to as NG-RAN 20) and a terminal 200 (hereinafter, referred to as User Equipment (UE) 200).

The NG-RAN 20 includes a radio base station 100 (hereinafter, gNB 100). Note that a specific configuration of the radio communication system 10 that includes a number of gNBs and UEs is not limited to the example illustrated in FIG. 1.

The NG-RAN 20 actually includes a plurality of NG-RAN Nodes, specifically, gNBs (or ng-eNBs), and is connected to a 5G core network (5GC) (not illustrated). Note that the NG-RAN 20 and the 5GC may be simply expressed as networks.

The gNB 100 is a 5G radio base station, and executes 5G radio communication with the UE 200 and 5G. The gNB 100 and the UE 200 can support massive multiple-input multiple-output (MIMO) that generates beams with higher directivity, carrier aggregation (CA) that bundles and uses a plurality of component carriers (CCs), dual connectivity (DC) that simultaneously performs communication between the UE and each of a plurality of NG-RAN Nodes, and the like, by controlling radio signals transmitted from a plurality of antenna elements.

In addition, in the embodiment, the gNB 100 employs a fronthaul (FH) interface defined by O-RAN.

(2) Configuration of Fronthaul

Figure 2:
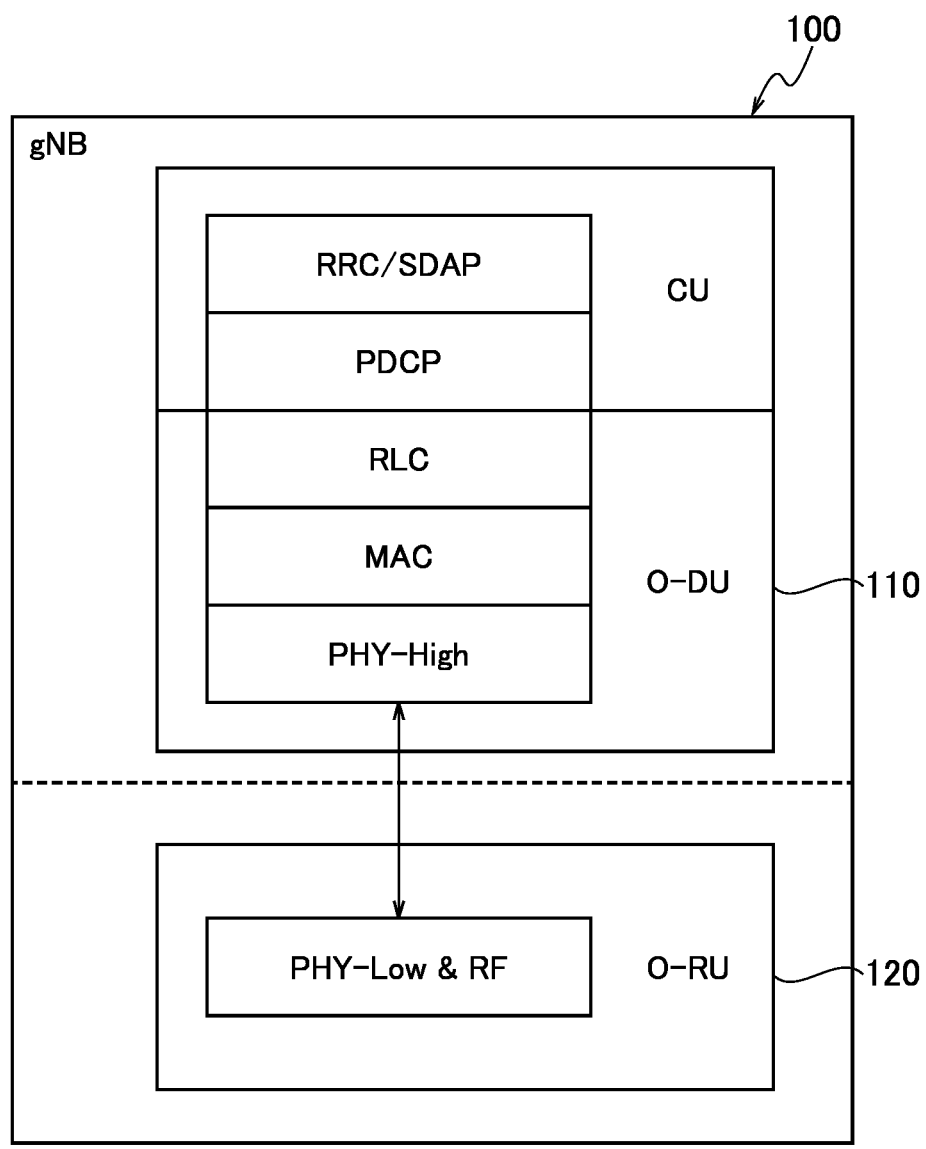
FIG. 2 is a diagram illustrating an internal configuration example of a gNB 100 that employs a fronthaul (FH) interface according to an embodiment.

FIG. 2 illustrates an internal configuration example of the gNB 100 that employs a fronthaul (FH) interface. As illustrated in FIG. 2, the gNB 100 includes an O-DU 110 (O-RAN Distributed unit) and an O-RU 120 (O-RAN radio unit). The O-DU 110 and the O-RU 120 are functionally split in a physical (PHY) layer defined in 3GPP.

The O-DU 110 may be referred to as the O-RAN distributed unit. The O-DU 110 is a logical node that mainly hosts a radio link control layer (RLC), a medium access control layer (MAC), and a PHY-High layer based on a lower layer function. Here, the O-DU 110 is provided closer to the NG-RAN 20 than the O-RU 120. Hereinafter, a side close to the NG-RAN 20 may be referred to as an RAN side.

The O-RU 120 may be referred to as the O-RAN radio unit. The O-RU 120 is a logical node that hosts a PHY-Low layer and RF processing based on functional division of lower layers. Here, the O-RU 120 is provided on the side away from the NG-RAN 20 than the O-DU 110. Hereinafter, the side away from the NG-RAN 20 may be referred to as an air side.

The PHY-High layer is a part of PHY processing on the O-DU 110 side of the fronthaul interface such as Forward Error Correction (FEC) encoding/decoding, scrambling, modulation/demodulation.

The PHY-Low layer is a part of the PHY processing on the O-RU 120 side of the fronthaul interface such as Fast Fourier Transform (FFT)/iFFT, digital beam forming, and Physical Random Access Channel (PRACH) extraction and filtering.

The O-CU is an abbreviation for an O-RAN Control Unit, and is a logical node that hosts Packet Data Convergence Protocol (PDCP), Radio Resource Control (RRC), Service Data Adaptation Protocol (SDAP), and other control functions.

Note that the fronthaul (FH) may be interpreted as a line between a baseband processing unit of the radio base station (base station device) and a radio device, and an optical fiber or the like is used.

(3) Network Configuration

Figure 3:
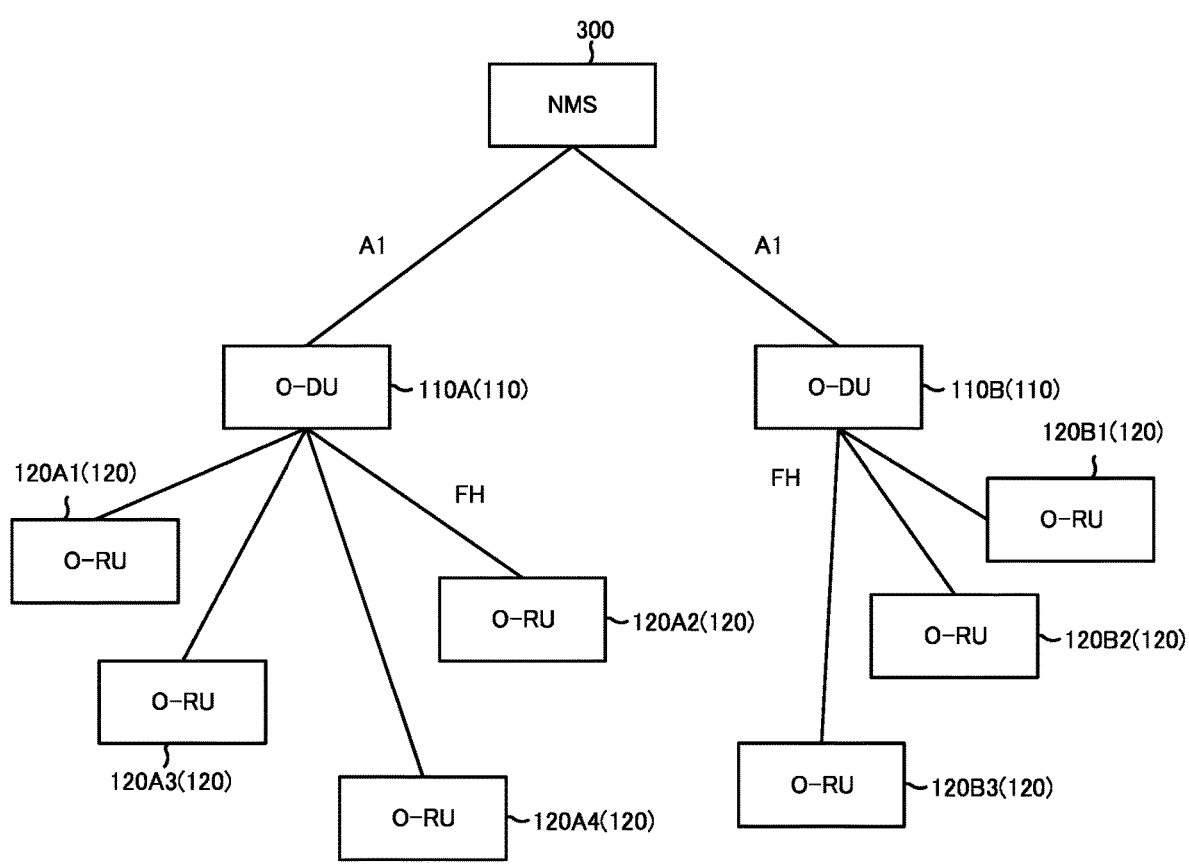
FIG. 3 is a diagram illustrating a network that employs the FH interface according to an embodiment.

FIG. 3 illustrates the network that employs the FH interface according to the embodiment. As illustrated in FIG. 3, the network includes the Network Management System (NMS) 300, the O-DU 110, and the O-RU 120.

The NMS 300 is an example of a management node that manages at least one of the O-DU 110 and the O-RU 120. The NMS 300 is an example of a non-real time RAN Intelligent Controller (RIC). The NMS 300 may be provided in a core network. In the embodiment, the NMS 300 may have an FH delay management function. The interface between the NMS 300 and the O-DU 110 may be referred to as an A1 interface between the non-real time RIC and the real time RIC (for example, gNB 100).

The O-DU 110 may be referred to as the O-RAN distributed unit as described above. The O-DU 110 is an example of a first base station that is provided on the FH and that communicates with the O-RU 120 on the FH. The O-DU 110 is provided toward the RAN side than the O-RU 120. The network may have at least one O-DU 110. In FIG. 3, a case where the O-DU 110A and the O-DU 110B are provided is exemplified as the O-DU 110. The O-DU 110A and the O-DU 110B may be provided by different vendors or operators.

The O-RU 120 may be referred to as the O-RAN radio unit as described above. The O-RU 120 is an example of a second base station that is provided on the FH and that communicates with the O-DU 110 on the FH. The O-RU 120 is provided toward the air side than the O-DU 110. The network may have one or more O-RUs 120. FIG. 3 illustrates a case in which an O-RU 120A1, an O-RU 120A2, an O-RU 120A3, and an O-RU 120A4 are provided as the O-RU 120 on an air side of an O-DU 110A. A case where an O-RU 120B1, an O-RU 120B2, and an O-RU 120B3 are provided as the O-RU 120 on an air side of an O-DU 110B is illustrated. The O-RU 120A1 to the O-RU 120A4 may be provided by different vendors or operators from each other, and the O-RU 120B1 to the O-RU 120B3 may be provided by different vendors or operators from each other.

Furthermore, the O-RU 120A1 to the O-RU 120A4 may be provided by different vendors or operators from the O-DU 110A, and the O-RU 120B1 to the O-RU 120B3 may be provided by different vendors or operators from the O-DU 110B.

In the example illustrated in FIG. 3, an FH delay time between O-DU 110A and O-RU 120A1 may be shorter than an FH delay time between the O-DU 110A and the O-RU 120A2. An FH delay time between the O-DU 110A and the O-RU 120A2 may be shorter than an FH delay time between the O-DU 110A and the O-RU 120A3. An FH delay time between the O-DU 110A and the O-RU 120A3 may be shorter than an FH delay time between the O-DU 110A and the O-RU 120A4. Similarly, an FH delay time between the O-DU 110B and the O-RU 120B1 may be shorter than an FH delay time between the O-DU 110B and the O-RU 120B2. An FH delay time between the O-DU 110B and the O-RU 120B2 may be shorter than an FH delay time between the O-DU 110B and the O-RU 120B3.

Here, in the FH between the O-DU 110 and the O-RU 120, the following signal communication is performed. Specifically, in the FH between the O-DU 110 and the O-RU 120, signal communication on a plurality of planes (for example, U/C/M/S-planes) is performed.

The U-plane is a protocol for transmitting user data, and the C-plane is a protocol for transmitting a control signal. The M-plane is a management plane that handles a maintenance supervisory signal, and the S-plane is a protocol for realizing Synchronization between devices.

Specifically, the U-plane signal includes a signal transmitted (DL) by the O-RU 120 in a radio section and a signal received (UL) from the radio section, and exchanged by a digital IQ signal. In addition to so-called the U-plane signal (data such as User Datagram Protocol (UDP) and Transmission Control Protocol (TCP)), it should be noted the C-plane (RRC, Non-Access Stratum (NAS), and the like) defined in 3GPP is also the U-plane from the FH perspective.

The C-plane signal includes a signal (signal for notifying information related to radio resource mapping and beamforming of the corresponding U-plane) necessary for various controls related to transmission/reception of the U-plane signal. Note that the C-plane (RRC, NAS, and the like) defined in 3GPP refers to a completely different signal.

The M-plane signal includes a signal necessary for managing the O-DU 110/O-RU 120. For example, the M-plane signal is a signal for notifying various hardware (HW) capacities of the O-RU 120 from the O-RU 120 or notifying various setting values from the O-DU 110 to the O-RU 120.

The S-plane signal includes a signal necessary for synchronization control between the O-DU 110/O-RU 120.

In the embodiment, a procedure for configuring at least one of the Reception window and the Transmission window of the O-DU 110 under such a background will be described. As such a procedure, the following first procedure to the third procedure can be considered.

In the first procedure, the NMS 300 acquires a delay profile (hereinafter, O-RU delay profile) of each O-RU 120 from the O-DU 110. The NMS 300 determines the window parameter used to specify at least one the Reception window and the Transmission window used by the O-DU 110, based on the delay parameter (hereinafter, FH delay parameter) defined by the FH between the O-DU 110 and the O-RU 120 and the O-RU delay profile. The NMS 300 notifies the O-DU 110 of the window parameter. The O-DU 110 configures at least one of the Reception window and the Transmission window used by the O-DU 110 based on the window parameter.

In the second procedure, the O-DU 110 acquires the O-RU delay profile from each O-RU 120. The O-DU 110 acquires the FH delay parameter from the NMS 300. The O-DU 110 configures at least one of the Reception window and the Transmission window used by the O-DU 110 based on the O-RU delay profile and the FH delay parameter.

In the third procedure, the NMS 300 acquires the O-RU delay profile from each O-RU 120. The NMS 300 determines the window parameter used to specify at least one of the Reception window and the Transmission window used by the O-DU 110 based on the FH delay parameter and the O-RU delay profile. The NMS 300 notifies the O-DU 110 of the window parameter. The O-DU 110 configures at least one of the Reception window and the Transmission window used by the O-DU 110 based on the window parameter.

Note that the O-RU delay profile, the FH delay parameter, and the window parameter will be described later in detail (see FIGS. 8 to 11).

(4) Shared Cell Configuration

In the O-RAN, there is also a station arrangement method that constitutes one cell with a plurality of O-RUs, a configuration that uses a device (fronthaul multiplexing (FHM)) that bundles O-RUs, and a configuration (cascade configuration) that continuously connects O-RUs is under consideration. These are collectively called a Shared Cell. Such a Shared Cell may be adopted in the network illustrated in FIG. 3.

Figure 4A:
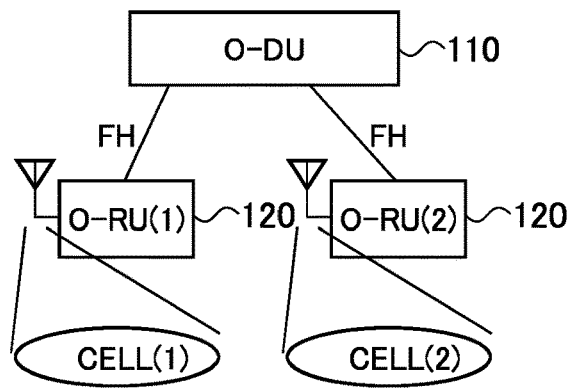
FIG. 4A is a diagram illustrating a configuration example (not including an intermediate device) of the fronthaul according to the embodiment.
Figure 4B:
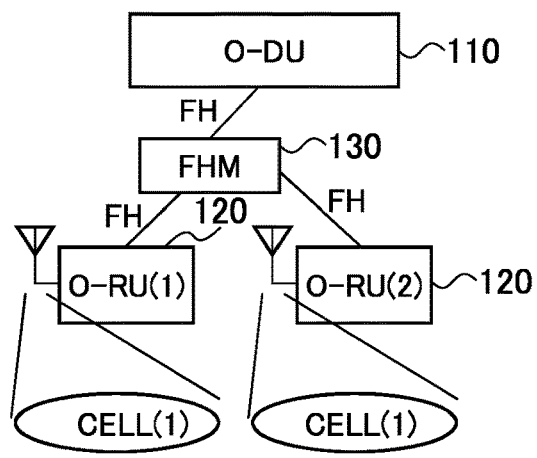
FIG. 4B is a diagram illustrating a configuration example (including an intermediate device, FHM configuration) of the fronthaul according to the embodiment.
Figure 4C:
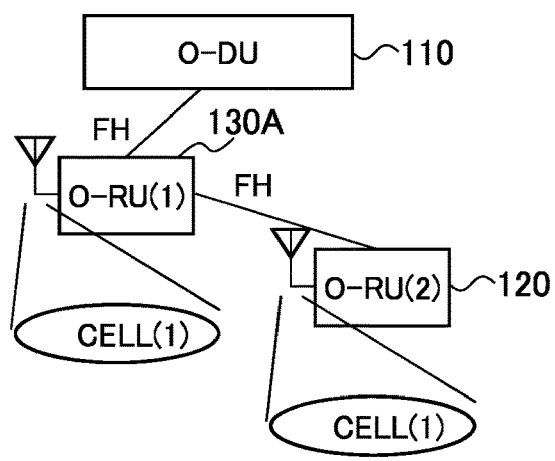
FIG. 4C is a diagram illustrating a configuration example (including an intermediate device, cascade configuration) of the fronthaul according to the embodiment.

FIGS. 4A to 4C illustrate a configuration example of the fronthaul. FIG. 4A is an example of configuring one cell with one O-RU. On the other hand, FIGS. 4B and 4C illustrate an example of the Shared Cell configuration.

Specifically, FIG. 4B illustrates a configuration example using FHM 130. Further, FIG. 4C illustrates an example in which O-RUs 130A are cascade-connected with being interposed between the O-DU 110 and the O-RU 120.

In the case of FIG. 4B, the FHM 130 combines two FH signals from each O-RU 120 and then transmits the combined signals to the O-DU 110.

In the case of FIG. 4C, the O-RU 130A combines the signal received by the O-RU 130A (O-RU(1)) itself in the radio section and the FH signal received from the O-RU 120 (O-RU(2)), and then transmits the combined signal to the O-DU 110.

In the following description, the FHM 130 and the O-RU 130A will be collectively referred to as an intermediate device 130. However, the name of the intermediate device may be called by another name. The intermediate device 130 is provided toward the air side than the O-DU 110 and toward the RAN side than the O-RU 120.

As a feature of such a Shared Cell configuration, the intermediate device 130 transmits a DL signal received from the O-DU 110 to the O-RU 120 for downlink (DL). In the case of the cascade connection of the O-RUs, the intermediate device 130 may further transmit the DL signal of the O-RU itself.

In addition, for the uplink (UL), the intermediate device 130 combines the UL signals received from the O-RU 120 and transmits the combined UL signal to the O-DU 110. In the case of the cascade connection of the O-RUs, the radio signals received by the O-RUs themselves are also combined.

With such a feature, the O-DU 110 can perform signal processing as if one O-RU is connected.

(5) Functional Block Configuration of Radio Communication System

Next, the functional block configuration of the radio communication system 10 will be described. Specifically, the functional block configuration of the NMS 300, the O-DU 110, and the O-RU 120 will be described.

(5.1) NMS 300

Figure 5:
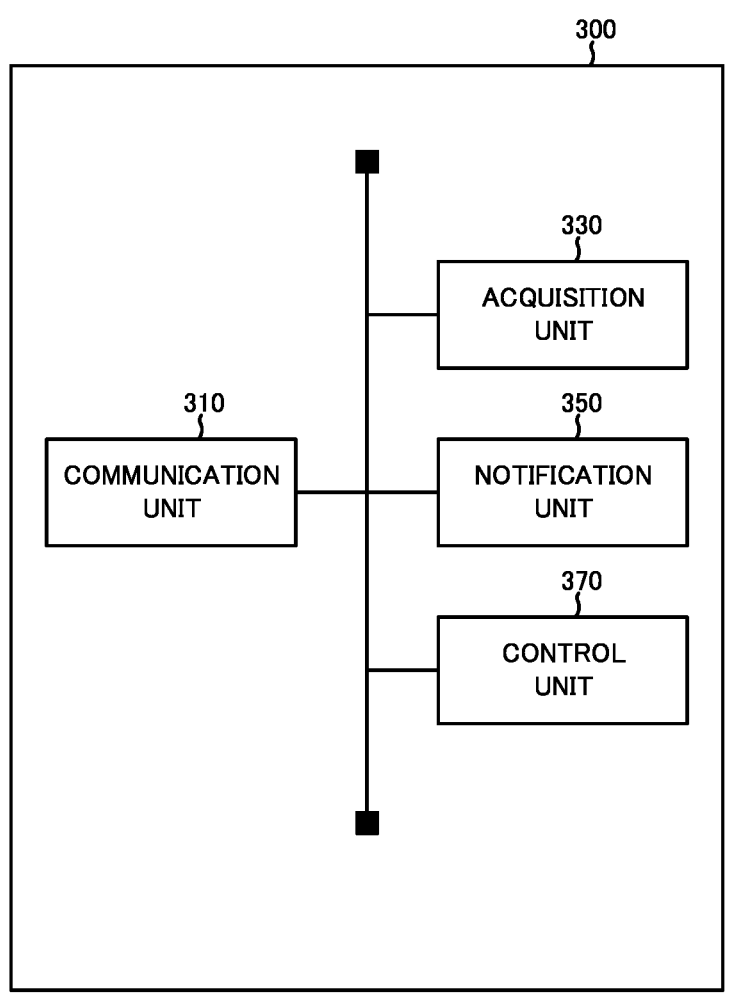
FIG. 5 is a functional block configuration diagram of an NMS 300 according to an embodiment.

FIG. 5 is a functional block configuration diagram of the NMS 300. As illustrated in FIG. 5, the NMS 300 includes a communication unit 310, an acquisition unit 330, a notification unit 350, and a control unit 370.

The communication unit 310 communicates with the O-DU 110. The communication unit 310 may also communicate with the O-RU 120. The communication unit 310 executes communication of the parameters used for configuring the Reception window and the Transmission window used by the O-DU 110.

The acquisition unit 330 acquires various parameters. For example, the acquisition unit 330 acquires the O-RU delay profile from the O-DU 110 in the first procedure described above. The acquisition unit 330 acquires the O-RU delay profile from the O-RU 120 in the third procedure.

The notification unit 350 notifies various parameters. For example, the notification unit 350 notifies the O-DU 110 of the window parameter in the second procedure described above.

The control unit 370 controls the NMS 300. For example, the control unit 370 determines the window parameter based on the FH delay parameter and the O-RU delay profile in the first procedure and the third procedure described above.

(5.2) O-DU 110

Figure 6:
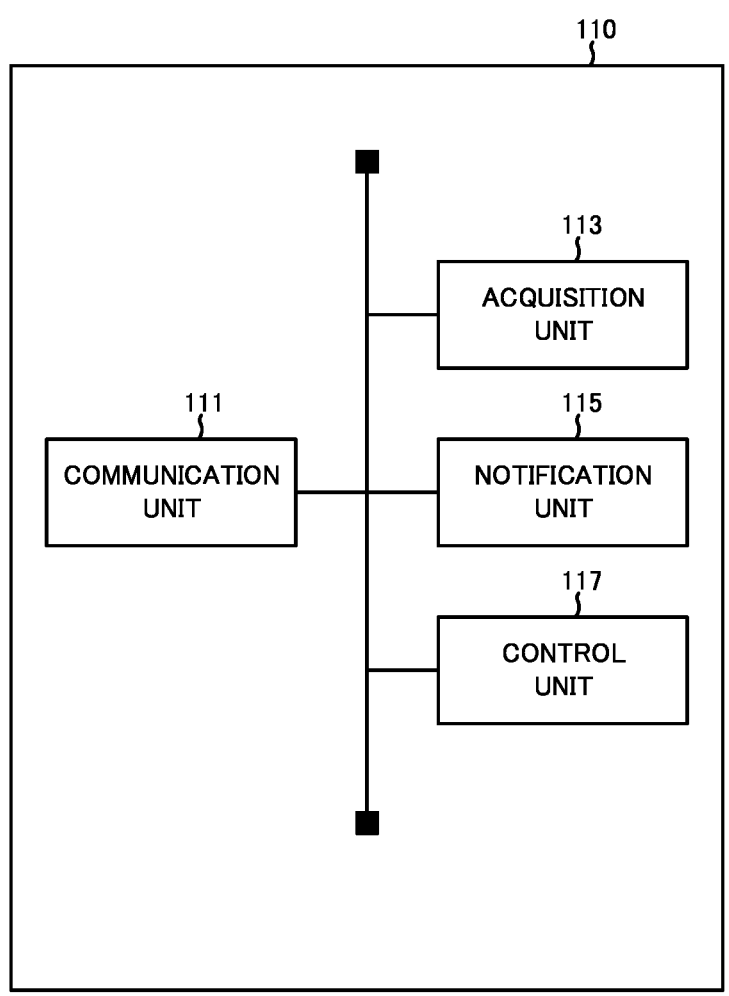
FIG. 6 is a functional block configuration diagram of an O-DU 110 according to an embodiment.

FIG. 6 is a functional block configuration diagram of the O-DU 110. As illustrated in FIG. 6, the O-DU 110 includes a communication unit 111, an acquisition unit 113, a notification unit 115, and a control unit 117.

The communication unit 111 communicates with the O-RU 120. The communication unit 111 may communicate with the NMS 300. For example, the communication unit 111 executes communication of signals on the various planes described above.

The acquisition unit 113 acquires various parameters. For example, the acquisition unit 113 acquires the O-RU delay profile from the O-RU 120 in the first procedure to the third procedure described above. The acquisition unit 113 acquires the window parameter from the NMS 300 in the first procedure and the third procedure described above. The acquisition unit 113 acquires the FH delay parameter from the NMS 300 in the second procedure described above.

The notification unit 115 notifies various parameters. For example, the notification unit 115 notifies the NMS 300 of the O-RU delay profile in the first procedure described above.

The control unit 117 controls the O-DU 110. For example, the control unit 117 configures at least one of the Reception window and the Transmission window based on the window parameter in the first procedure and the third procedure described above. In the second procedure described above, the control unit 117 configures at least one of the Reception window and the Transmission window based on the O-RU delay profile and the FH delay parameter.

(5.3) O-RU 120

Figure 7:
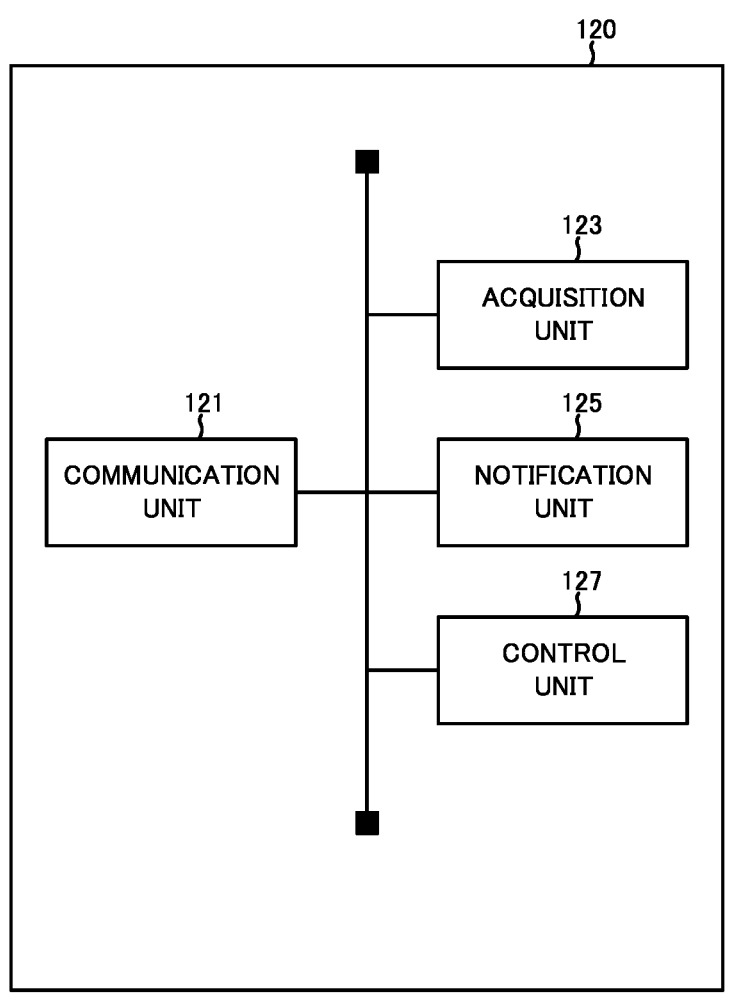
FIG. 7 is a functional block configuration diagram of an O-RU 120 according to an embodiment.

FIG. 7 is a functional block configuration diagram of the O-RU 120. As illustrated in FIG. 7, the O-RU 120 includes a communication unit 121, an acquisition unit 123, a notification unit 125, and a control unit 127.

The communication unit 121 communicates with the O-DU 110. The communication unit 121 may communicate with the NMS 300. For example, the communication unit 121 executes communication of signals on the various planes described above.

The acquisition unit 123 acquires various parameters. The acquisition unit 123 acquires parameters used in Software management from the O-DU 110. The software management is a procedure defined in chapter 5 of ORAN-WG4.MP.0-v02.00, and the like.

The notification unit 125 notifies various parameters. The notification unit 125 notifies the O-DU 110 of the O-RU delay profile in the first procedure to the third procedure described above. The notification unit 125 notifies the NMS 300 of the O-RU delay profile in the third procedure described above.

The control unit 127 controls the O-RU 120. For example, the control unit 127 configures at least one of the Reception window and the Transmission window.

(6) Configuration of Window

First, the UL signal will be described with reference to FIG. 8.

Figure 8:
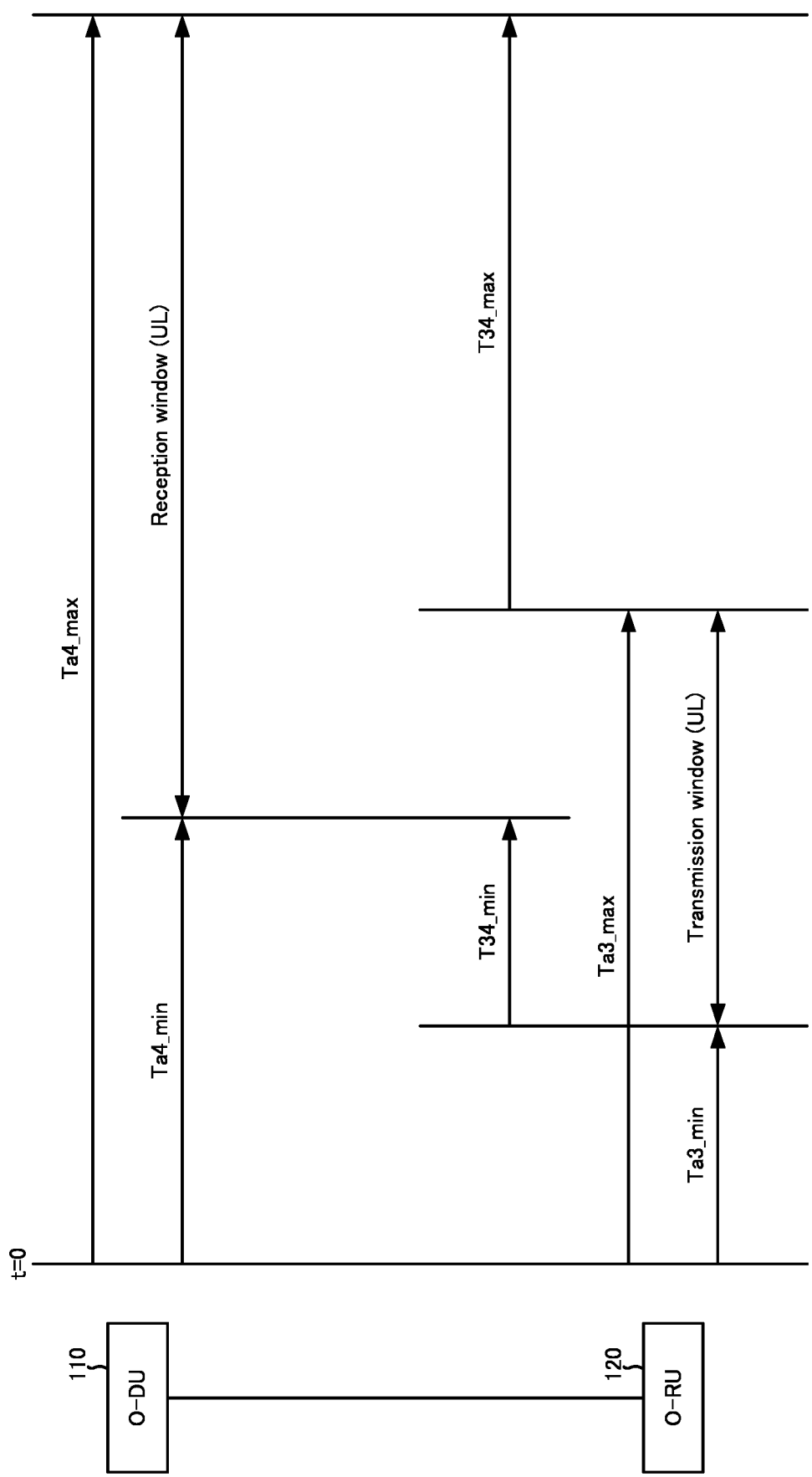
FIG. 8 is a diagram illustrating a delay management example of fronthaul in UL according to an embodiment.

As illustrated in FIG. 8, the Transmission window (UL) of the O-RU 120 can be defined by parameters (Ta3_min, Ta3_max). That is, the Transmission window (UL) can be represented by a difference between Ta3_max and Ta3_min. The parameters (Ta3_min and Ta3_max) may be interpreted as a measurement result from the reception at an O-RU antenna to output at an O-RU port (R3). Ta3_min and Ta3_max are examples of the O-RU delay profiles. Ta3_min and Ta3_max may be different for each O-RU 120.

On the other hand, the Reception window (UL) of the O-DU 110 can be defined by the parameters (Ta4_min and Ta4_max). That is, the Reception window (UL) can be represented by a difference between Ta4_max and Ta4_min. The parameters (Ta4_min and Ta4_max) may be interpreted as a measurement result from the reception at the O-RU antenna to output at the O-DU port (R4). The parameters (Ta4_min and Ta4_max) may be measured by the delay measurement message (Measured Transport Method).

Here, as the FH delay parameter described above, a parameter (T34_min) indicating the difference between the Ta4_min and the Ta3_min may be defined in advance. As the FH delay parameter described above, a parameter (T34_max) indicating the difference between the Ta4_max and the Ta3_max may be defined in advance. The FH delay parameter is managed by the NMS 300. The T34_min and the T34_max may be defined for each O-RAN use case. The T34_min and the T34_max may be different for each O-DU 110 or may be common to the O-DU 110.

Under these premises, the Ta4_min that defines the Reception window (UL) has only to satisfy the condition that O-RU 120 existing toward the air side than O-DU 110, is a value of Ta3_min+T34_min or less. The Ta4_max that defines the Reception window (UL) has only to satisfy the condition that it is a value of Ta3_max+T34_max or greater for the O-RU 120 existing toward the air side than the O-DU 110. The NMS 300 determines the window parameter so as to satisfy these conditions (window condition). Alternatively, the O-DU 110 configures the Reception window (UL) so as to satisfy the window condition.

In this way, the Reception window (UL) can be defined by the O-RU delay profile (Ta3_min, Ta3_max) and the FH delay parameter (T34_min, T34_max). The window parameter may include Ta4_min and Ta4_max.

Secondarily, the DL signal will be described with reference to FIG. 9.

Figure 9:
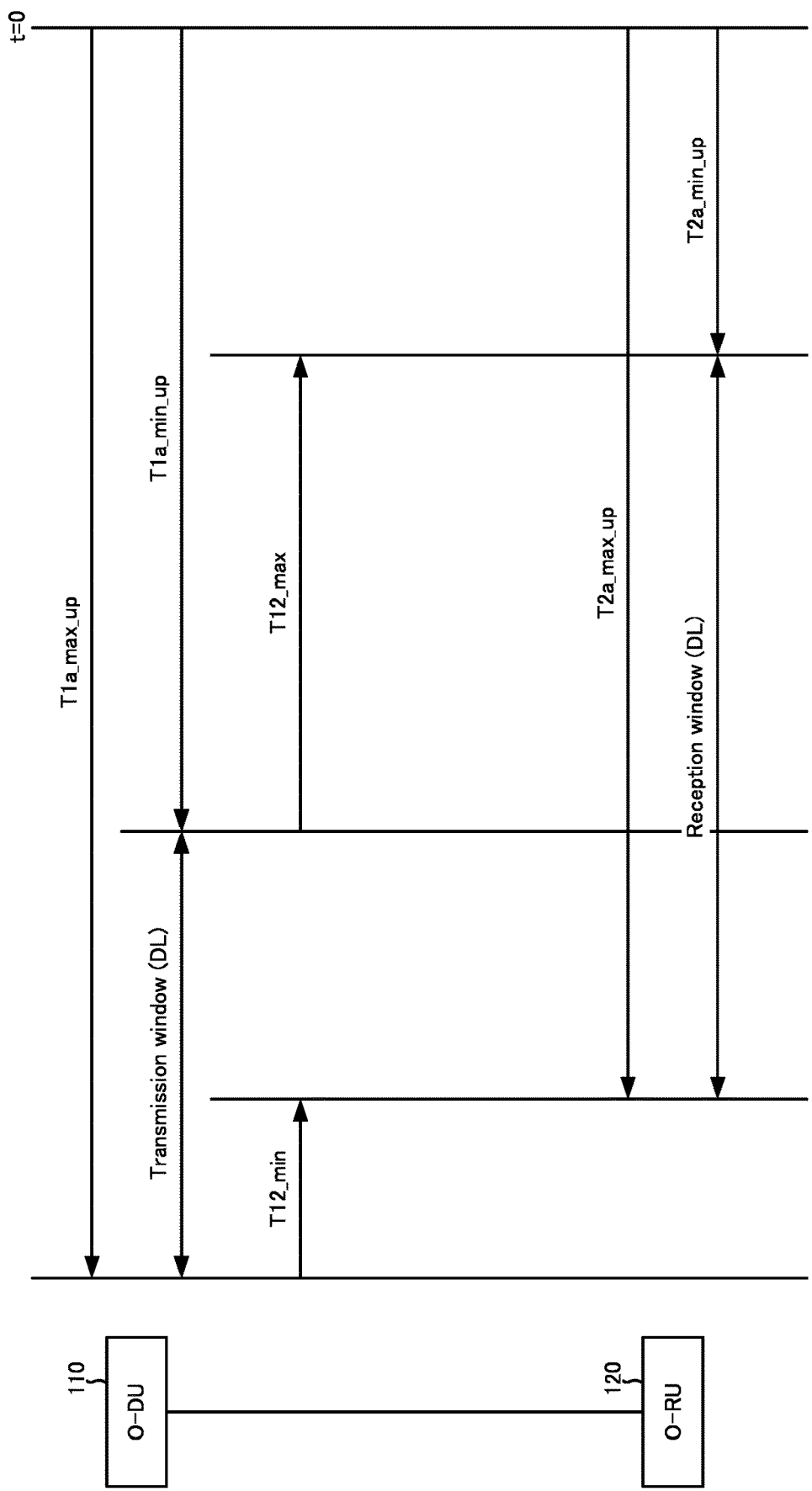
FIG. 9 is a diagram illustrating a delay management example of fronthaul in DL according to an embodiment.

As illustrated in FIG. 9, the Transmission window (DL) of the O-DU 110 can be defined by parameters (T1a_min_up and T1a_max_up). The Transmission window (DL) can be represented by a difference between T1a_max_up and T1a_min_up. The parameters (T1a_min_up and T1a_max_up) may be interpreted as the measurement result from the output at the O-DU port (R1) to the radio transmission. The parameters (T1a_min_up and T1a_max_up) may be measured by the delay measurement message (measured transport method).

On the other hand, the Reception window (DL) of the O-RU 120 can be defined by the parameters (T2a_min_up and T2a_max_up). The Reception window (DL) can be represented by the difference between T2a_max_up and T2a_min_up. The parameters (T2a_min_up and T2a_max_up) may be interpreted as measurement results from the reception at the O-RU port (R2) to the radio transmission. The T2a_min_up and the T2a_max_up are examples of O-RU delay profiles. The T2a_min_up and the T2a_max_up may be different for each O-RU 120.

Here, as the FH delay parameter described above, a parameter (T12_min) indicating the difference between the T1a_max_up and the T2a_max_up may be defined in advance. As the FH delay parameter described above, a parameter (T12_max) indicating the difference between the T1a_min_up and the T2a_min_up may be defined in advance. The FH delay parameter is managed by the NMS 300. The T12_min and the T12_max may be defined for each use case of the O-RAN. The T12_min and the T12_max may be different for each O-DU 110 or may be common to the O-DU 110.

Under these assumptions, the T1a_min_up that defines the Transmission window (DL) has only to satisfy the condition that it is a value of T2a_min_up+T12_max or greater for the O-RU 120 existing toward the air side than the O-DU 110. The T1a_max_up defining the Transmission window (DL) only has to satisfy the condition that the O-RU 120 existing toward the air side than the O-DU 110, has a value of T2a_max_up+T12_min or less. The NMS 300 determines the window parameter so as to satisfy these conditions (window condition). Alternatively, the O-DU 110 configures the Transmission window (DL) so as to satisfy the window condition.

In this way, the Transmission window (DL) can be defined by the O-RU delay profile (T2a_min_up and T2a_max_up) and the FH delay parameters (T12_min and T12_max). The window parameter may include T1a_min_up and T1a_max_up.

Note that "up" means the U-plane. Parameters for the DL signal on the C-plane may include T1a_min_cp_dl, T1a_max_cp_dl, T2a_min_cp_dl, T2a_max_cp_dl, and Tcp_adv_dl. In such cases, "cp" means the C-plane. The T1a_min_cp_dl may be represented by T1a_min_up+Tcp_adv_dl, and the T1a_max_cp_dl may be represented by T1a_max_up+Tcp_adv_dl. Similarly, T2a_min_cp_dl may be represented by T2a_min_up+Tcp_adv_d1 and T2a_max_cp_dl may be represented by T2a_max_up+Tcp_adv_dl.

Therefore, for the DL signal on the C-plane, T2a_min_cp_d1 and T2a_max_cp_dl are examples of O-RU delay profiles. The Tcp_adv_dl may be a value defined for each use case of the O-RAN. The Tcp_adv_dl may be an example of the O-RU delay profile. The T1a_min_cp_dl and the T1a_max_cp_dl may be examples of the window parameters.

(7) Parameter

First, the O-RU delay profile will be described.

As illustrated in FIG. 10, the O-RU delay profile (ro ru-delay-profile) may include T2a_min_up (ro t2a-min-up), T2a_max_up (ro t2a-max-up), T2a_min_cp_dl (ro t2a-min-cp-dl), T2a_max_cp_dl (ro t2a-max-cp-dl), Tcp_adv_dl (ro tcp-adv-dl), Ta3_min (ro ta3-min), Ta3_max (ro ta3-max), and the like.

Although not described in FIGS. 8 and 9, the O-RU delay profile may include parameters (T2a_min_cp_ul (ro t2a-min-cp-ul), T2a_max_cp_ul (ro t2a-max-cp-ul)) used in the UL signal on the C-plane. The T2a_min_cp_ul may be a value defined for each use case of the O-RAN. The T2a_max_cp_ul has only to satisfy the condition that it is a value of T2a_min_cp_ul+(T12_max-T12_min)+O-DU Transmission window or greater.

Secondly, the window parameter will be described. The window parameter may be read as a delay profile (O-DU delay profile) for the O-DU 110.

As illustrated in FIG. 11, the window parameter (rw O-DU-delay-profile) may include T1a_min_up (rw t1a-min-up), T1a_max_up (rw t1a-max-up), T1a_min_cp_dl (rw t1a-min-cp-dl), T1a_max_cp_dl (rw t1a-max-cp-dl), Ta4_min (rw ta4-min), Ta4_max (rw ta4-max), and the like.

Although not described in FIGS. 8 and 9, the window parameter may include parameters (T1a_min_cp_ul (rw t1a-min-cp-ul), T1a_max_cp_ul (rw t1a-max-cp-ul)) used in the UL signal on the C-plane. The T1a_min_cp_ul has only to satisfy the condition that it is a value of T12_max+T2a_min_cp_ul or greater. The T1a_max_cp_ul has only to satisfy a condition that it is a value of T12_min+T2a_max_cp_ul or less.

(8) Operation of Radio Communication System

Next, an operation of the radio communication system 10 will be described. Specifically, the first procedure to the third procedure described above will be described. Although omitted in FIGS. 12 to 14, two or more O-DUs 110 may be provided, and two or more O-RUs 120 may be provided.

First, the first procedure will be described with reference to FIG. 12.

Figure 12:
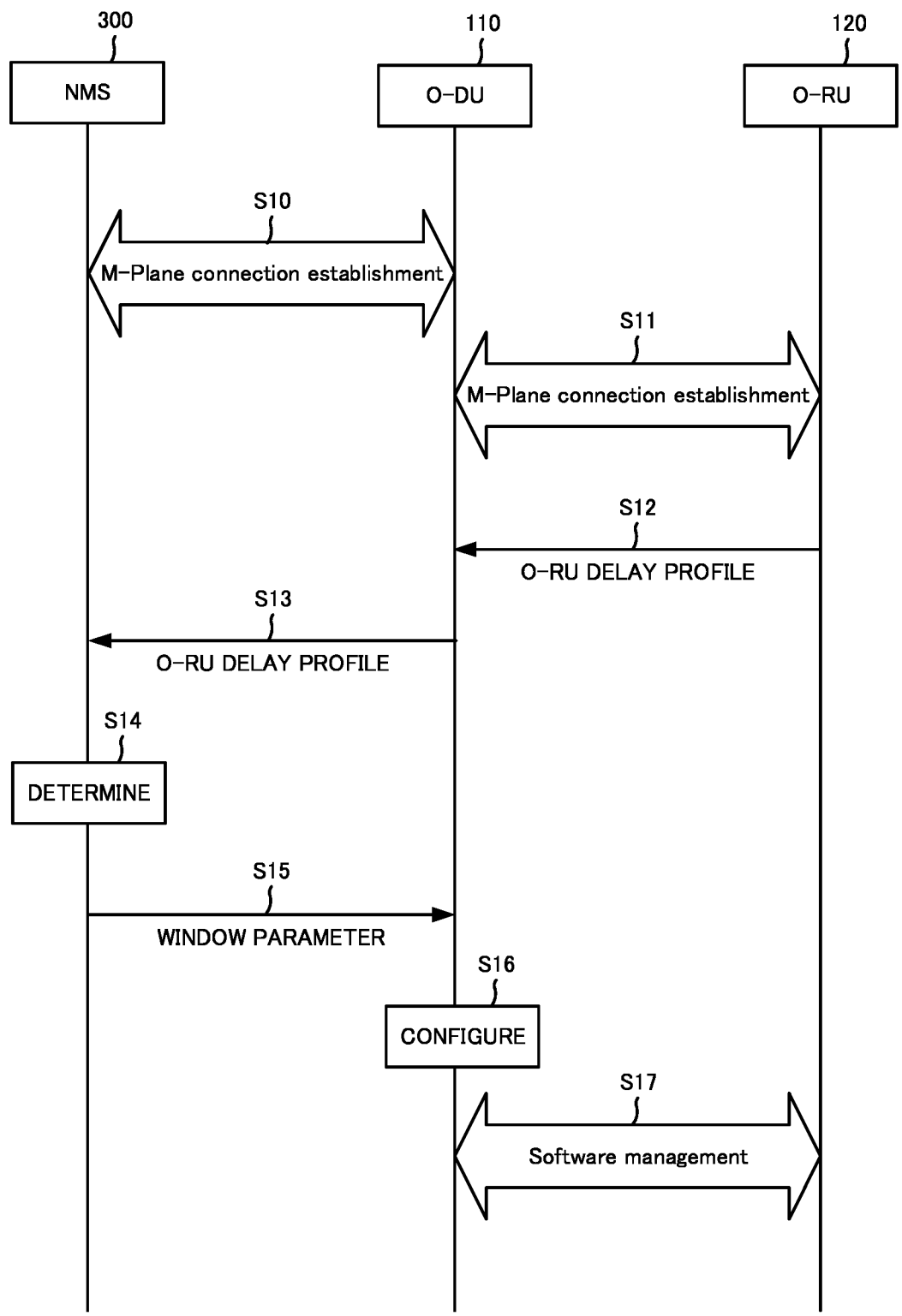
FIG. 12 is a sequence diagram for explaining a first procedure according to an embodiment.

As illustrated in FIG. 12, in step S10, a procedure of M-plane connection establishment is performed between the NMS 300 and the O-DU 110. In step S11, the procedure of the M-plane connection establishment is performed between the O-DU 110 and the O-RU 120. The procedure of the M-plane connection establishment is a procedure for configuring the M-plane.

In step S12, the O-RU 120 transmits the O-RU delay profile to the O-DU 110. For example, the O-RU delay profile includes the parameters illustrated in FIG. 10. However, the parameters for the C-plane can be computed by the O-DU 110, and therefore may not be included in the O-RU delay profile.

In step S13, the O-DU 110 transmits the O-RU delay profile to the NMS 300. For example, the O-RU delay profile includes the parameters illustrated in FIG. 10. However, the parameters for the C-plane can be computed by the O-DU 110, and therefore may not be included in the O-RU delay profile.

In step S14, the NMS 300 determines the window parameter used to specify at least one of the Reception window and the Transmission window used by the O-DU 110 based on the O-RU delay profile and the FH delay parameter.

In step S15, the NMS 300 transmits the window parameter determined in step S14 to the O-DU 110. For example, the window parameter includes the parameters illustrated in FIG. 11. However, the parameters for the C-plane can be computed by the O-DU 110, and therefore may not be included in the window parameter. The window parameter is determined so as to satisfy the window condition.

In step S16, the O-DU 110 configures at least one of the Transmission window and the Reception window based on the window parameter.

In step S17, the procedure of the Software management is performed between the O-DU 110 and the O-RU 120. The procedure of the Software management is a procedure for allowing desired software to be downloaded, installed, and activated by the O-RU 120 (see chapter 5 of ORAN-WG4.MP.0-v02.00).

Secondly, the second procedure will be described with reference to FIG. 13.

Figure 13:
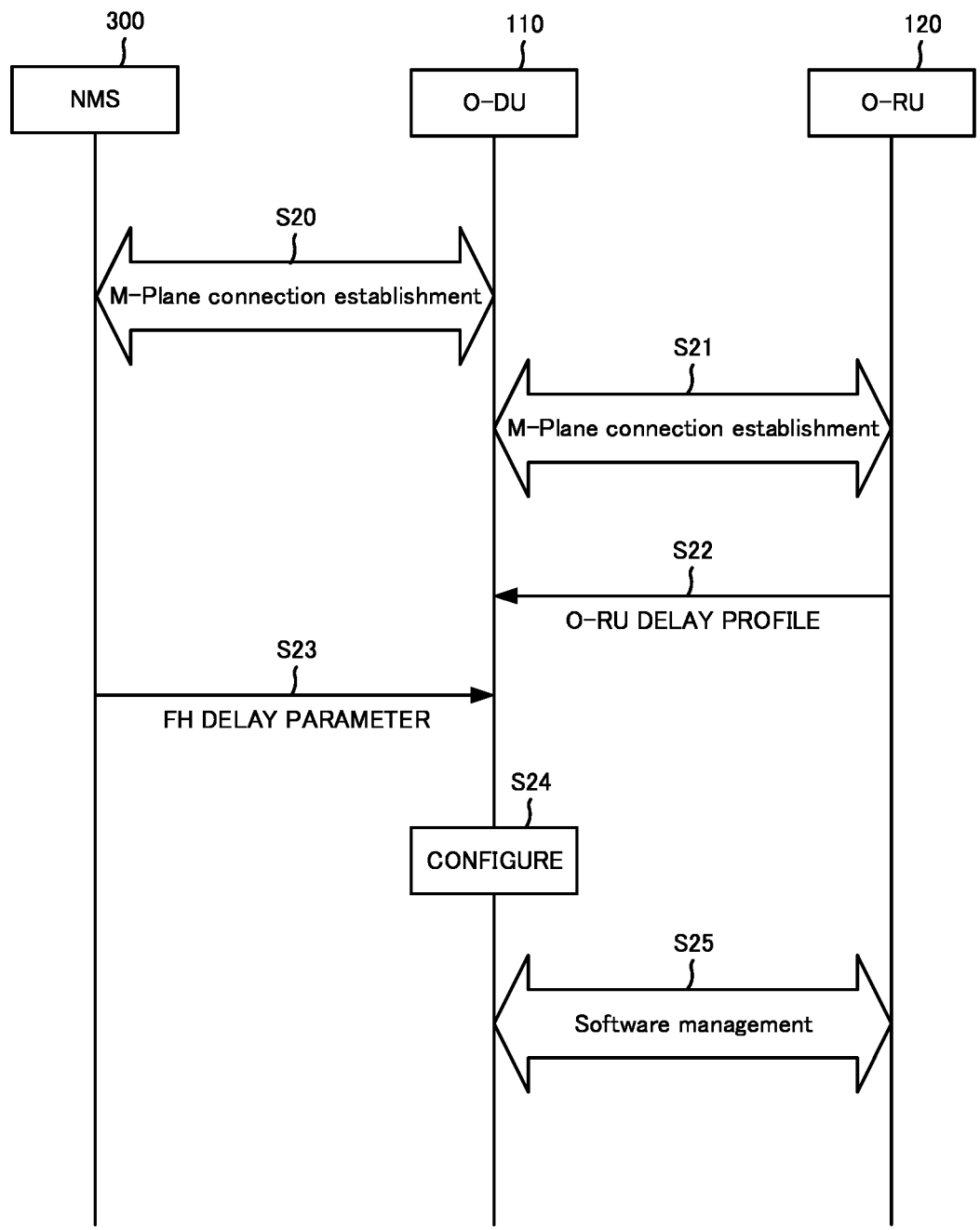
FIG. 13 is a sequence diagram for explaining a second procedure according to an embodiment.

As illustrated in FIG. 13, similar to step S10, in step S20, the procedure of the M-plane connection establishment is performed between the NMS 300 and the O-DU 110. In step S21, similar to step S11, the procedure of the M-plane connection establishment is performed between the O-DU 110 and the O-RU 120.

Similar to step S12, in step S22, the O-RU 120 transmits the O-RU delay profile to the O-DU 110.

In step S23, the NMS 300 transmits the FH delay parameter to the O-DU 110. The FH delay parameter includes T12_min, T12_max, T34_min, and T34_max.

In step S24, the O-DU 110 configures at least one of the Reception window and the Transmission window based on the O-RU delay profile and the FH delay parameter. For example, the O-DU 110 configures the Reception window (UL) so as to satisfy the window condition. Similarly, the O-DU 110 configures the Transmission window (DL) so as to satisfy the window condition.

Similar to step S17, in step S25, the procedure of the Software management is performed between the O-DU 110 and the O-RU 120.

Thirdly, the third procedure will be described with reference to FIG. 14.

Figure 14:
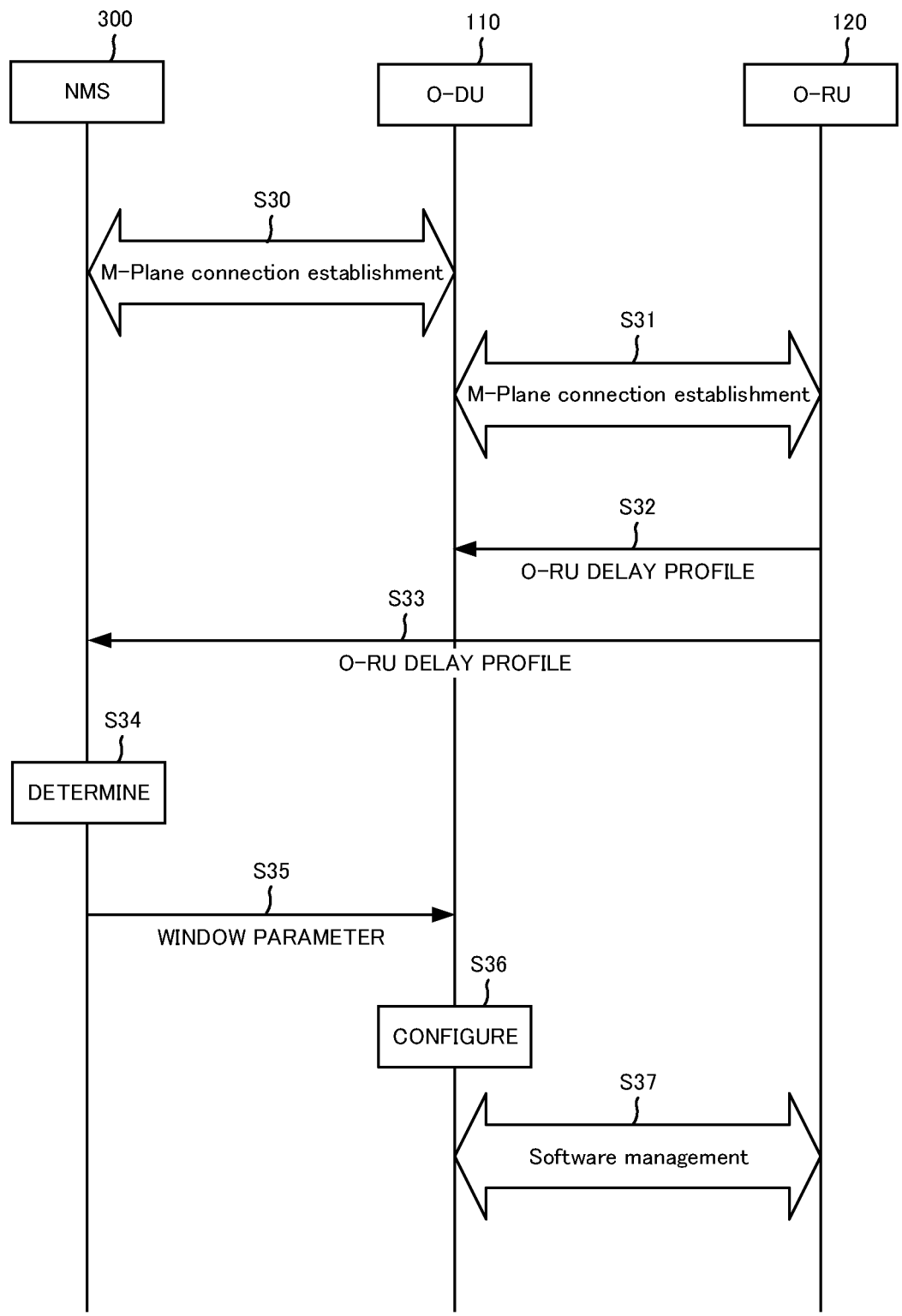
FIG. 14 is a sequence diagram for explaining a third procedure according to an embodiment.

As illustrated in FIG. 14, similar to step S10, in step S30, the procedure of the M-plane connection establishment is performed between the NMS 300 and the O-DU 110. In step S31, similar to step S11, the procedure of the M-plane connection establishment is performed between the O-DU 110 and the O-RU 120.

Similar to step S12, in step S32, the O-RU 120 transmits the O-RU delay profile to the O-DU 110.

In step S33, the O-RU 120 transmits the O-RU delay profile to the NMS 300. For example, the O-RU delay profile includes the parameters illustrated in FIG. 10. However, the parameters for the C-plane can be computed by the O-DU 110, and therefore may not be included in the O-RU delay profile.

Similar to step S14, in step S34, the NMS 300 determines the window parameter based on the O-RU delay profile and the FH delay parameter.

Similar to step S15, in step S35, the NMS 300 transmits the window parameter determined in step S34 to the O-DU 110.

Similar to step S16, in step S36, the O-DU 110 configures at least one of the Transmission window and the Reception window based on the window parameter.

Similar to step S17, in step S37, the procedure of the Software management is performed between the O-DU 110 and the O-RU 120.

(9) Action and Effect

In the embodiment, the NMS 300 determines the window parameter (first procedure and third procedure) based on the O-RU delay profile and the FH delay parameter. With such a configuration, even when the O-DU 110 and the O-RU 120 are provided by different vendors or operators, the Transmission window or the Reception window used by the O-DU 110 can be appropriately configured by the NMS 300 interposed therebetween. As a result, the FH delay management can be appropriately performed.

In the embodiment, the O-DU 110 configures the Transmission window or the Reception window based on the FH delay parameter and the O-RU delay profile acquired from the NMS 300 (second procedure). With such a configuration, even when the O-DU 110 and the O-RU 120 are provided by different vendors or operators, the Transmission window or the Reception window used by the O-DU 110 can be appropriately configured by the NMS 300 interposed therebetween. As a result, the FH delay management can be appropriately performed.

OTHER EMBODIMENTS

Although the contents of the present invention have been described hereinabove with reference to the embodiments, it is obvious to those skilled in the art that the present invention is not limited to these descriptions, and can be variously modified and improved.

In the first procedure and the third procedure described above, the O-DU 110 configures at least one (hereinafter, simply window) of the Transmission window and the Reception window based on the window parameter acquired from the NMS 300. In such a case, the NMS 300 may transmit a parameter that directly specifies the window to the O-DU 110 as the window parameter. The NMS 300 may transmit the parameter that directly specifies the window to the O-DU 110 as the window parameter. The parameter that indirectly specifies the window may be a parameter that specifies a range or condition that the window should satisfy.

In the first procedure and the third procedure described above, the NMS 300 acquires the O-RU delay parameter from the O-DU 110 or the O-RU 120. In such a case, the O-RU delay parameter may include the parameters for the U-plane instead of including the parameters for the C-plane. Furthermore, the window parameter notified from the NMS 300 to the O-DU 110 may include the parameters for the U-plane instead of the parameters for the C-plane. Further, the notification of the parameter already known by the O-DU 110 or the parameter that the O-DU 110 can calculate may be omitted.

The block configuration diagram (FIGS. 5 to 7) used for explaining the embodiments described above illustrates blocks of functional unit. Those functional blocks (structural components) can be realized by a desired combination of at least one of hardware and software. The method of realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include determining, deciding, judging, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting may be called a transmitting unit or a transmitter. For any of the above, as explained above, the realization method is not particularly limited to any one method.

Figure 15:
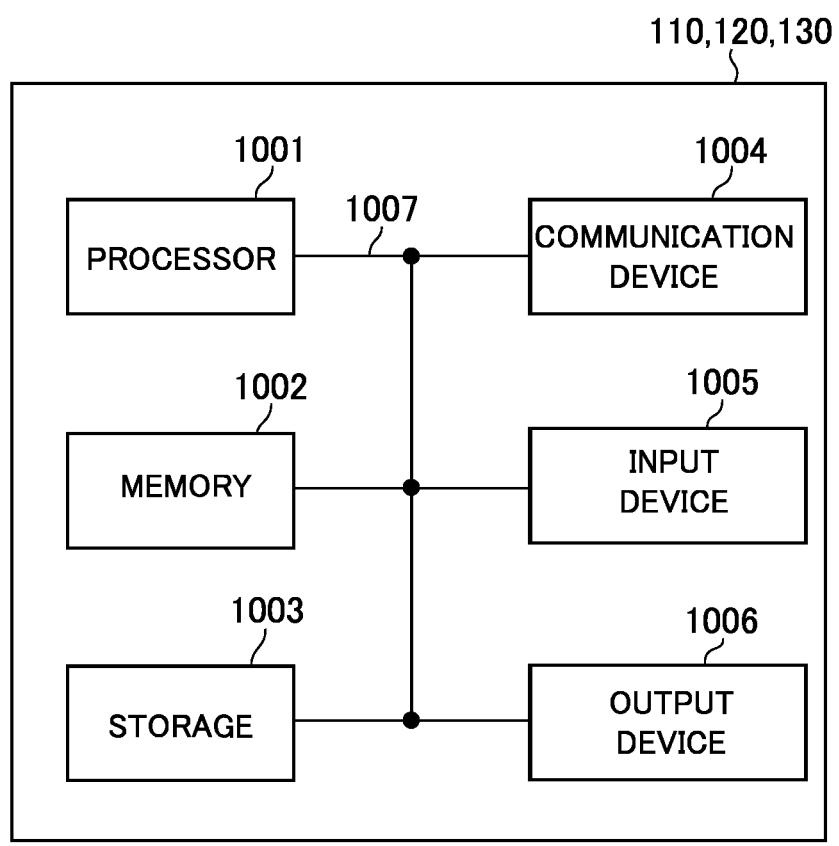
FIG. 15 is a diagram illustrating an example of a hardware configuration of the O-DU 110, the O-RU 120, and the NMS 300.

Furthermore, the above-described O-DU 110 and the intermediate device 130 (the device) can function as a computer that performs the processing of the radio communication method of the present disclosure. FIG. 15 is a diagram illustrating an example of a hardware configuration of the device. As illustrated in FIG. 15, the device can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices illustrated in the figure, or can be constituted by without including a part of the devices.

The functional blocks (see FIGS. 5 and 6) of the device can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the device by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation described in the above embodiments is used. Alternatively, various processes described above can be performed by one processor 1001 or can be performed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called a register, a cache, a main memory (main storage device), and the like. The memory 1002 can store therein a computer program (computer program codes), software modules, and the like that can execute the method according to the embodiment of the present disclosure.

The storage 1003 is a computer readable recording medium. Examples of the storage 1003 may include at least one of an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the device is configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by the hardware. For example, the processor 1001 may be implemented by using at least one of these hardware.

Notification of information is not limited to that described in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods described above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, computer program code, computer program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned in the present disclosure may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like described in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to as the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

The radio frame may be composed of one or a plurality of frames in the time domain. One frame or each of the plurality of frames in the time domain may be referred to as a subframe.

The subframe may be composed of one or a plurality of slots in the time domain. The subframe may also be a fixed time length (for example, 1 ms) that does not depend on numerology.

The numerology may be a communication parameter applied to at least one of transmission and reception of a certain signal or channel. The numerology may indicate at least one of, for example, Subcarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, specific windowing processing performed by a transceiver in a time domain, and the like.

The slot may be composed of one or a plurality of symbols (Orthogonal Frequency Division Multiplexing (OFDM)) symbols, Single Carrier Frequency Division Multiple Access (SC-FDMA) symbol, and the like in the time domain. The slot may be a time unit based on numerology.

The slot may include a plurality of minislots. Each minislot may be composed of one or a plurality of symbols in the time domain. In addition, the minislot may be referred to as a sub-slot. The minislot may be configured with a smaller number of symbols than that of the slot. A PDSCH (or PUSCH) transmitted in a time unit larger than a minislot may be referred to as a PDSCH (or PUSCH) mapping type A. A PDSCH (or PUSCH) transmitted using a minislot may be referred to as a PDSCH (or PUSCH) mapping type B.

All of the radio frame, the subframe, the slot, the minislot, and the symbol represent time units at the time of transmitting a signal. The radio frame, the subframe, the slot, the minislot, and the symbol may have different names corresponding thereto, respectively.

For example, one subframe may be referred to as a transmission time interval (TTI), a plurality of consecutive subframes may be referred to as TTI, and one slot or one minislot may be referred to as TTI. That is, at least one of the subframe and the TTI may be a subframe (1 ms) in the existing LTE, a period (for example, 1 to 13 symbols) shorter than 1 ms, or a period longer than 1 ms. Note that a unit representing TTI may be called a slot, a minislot, or the like instead of a subframe.

Here, the TTI refers to, for example, a minimum time unit of scheduling in radio communication. For example, in the LTE system, the base station performs scheduling to allocate radio resources (frequency bandwidth, transmission power, and the like that can be used in each user terminal) to each user terminal in units of TTI. Note that the definition of the TTI is not limited thereto.

The TTI may be a transmission time unit such as a channel-encoded data packet (transport block), a code block, and a codeword, or may also be a processing unit such as scheduling or link adaptation. Note that when the TTI is given, a time interval (for example, the number of symbols) in which the transport block, the code block, the codeword, and the like are actually mapped may be shorter than the TTI.

Note that when one slot or one minislot is referred to as the TTI, one or more TTIs (that is, one or more slots or one or more minislots) may be the minimum time unit of the scheduling. Further, the number of slots (the number of minislots) constituting the minimum time unit of the scheduling may be controlled.

A TTI having a time length of 1 ms may be referred to as a normal TTI (TTI in LTE Rel. 8-12), a normal TTI, a long TTI, a normal subframe, a normal subframe, a long subframe, a slot, or the like. A TTI shorter than the normal TTI may be referred to as a shortened TTI, a short TTI, a partial TTI (partial or fractional TTI), a shortened subframe, a short subframe, a minislot, a subslot, a slot, and the like.

Note that the long TTI (for example, normal TTI, subframe, and the like) may be read as a TTI having a time length exceeding 1 ms, and the short TTI (for example, a shortened TTI, and the like) may be read as a TTI that is less than the long TTI and has a TTI length of 1 ms or more.

The resource block (RB) is a resource allocation unit in the time domain and the frequency domain, and may include one or a plurality of consecutive subcarriers in the frequency domain. The number of subcarriers included in the RB may be the same regardless of the numerology, for example, 12. The number of subcarriers included in the RB may be determined based on the numerology.

Further, the time domain of the RB may include one or a plurality of symbols, and may have a length of 1 slot, 1 minislot, 1 subframe, or 1 TTI. 1 TTI, one subframe, and the like may be composed of one or a plurality of resource blocks.

Note that one or a plurality of RBs may be referred to as a Physical Resource Block (Physical RB: PRB), a Sub-Carrier Group (SCG), a Resource Element Group (REG), a PRB pair, an RB pair, and the like.

In addition, the resource block may be composed of one or a plurality of Resource Elements (RE). For example, 1 RE may be a radio resource region of one subcarrier and one symbol.

A Bandwidth Part (BWP) (may be called a partial bandwidth, and the like) may represent a subset of consecutive common Resource Blocks (RBs) for certain numerology in a certain carrier. Here, the common RB may be specified by an RB index based on a common reference point of the carrier. The PRB may be defined in a certain BWP and numbered within the BWP.

The BWP may include a UL BWP and a DL BWP. One or a plurality of BWPs may be configured in one carrier for the UE.

At least one of the configured BWPs may be active, and it may not be assumed that the UE transmits and receives a predetermined signal/channel outside the active BWP. Note that "cell", "carrier", and the like in this disclosure may be read as "BWP".

The structures of the radio frame, the subframe, the slot, the minislot, the symbol, and the like, described above are merely examples. For example, the configurations of the number of subframes included in a radio frame, the number of slots per subframe or radio frame, the number of minislots included in the slot, the number of symbols and RBs included in the slot or minislot, the number of subcarriers included in the RB, the number of symbols in the TTI, the symbol length, the Cyclic Prefix (CP) length, and the like can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above devices may be replaced with a "unit", a "circuit" a, "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles shall include plurality of nouns following these articles.

The term "determining" and "deciding" used in the present disclosure may include a wide variety of operations. The "determining" and "deciding" may include, for example, judging, calculating, computing, processing, deriving, investigating, looking up (search, inquiry) (for example, searching in a table, a database or another data structure), and may include ones regarding ascertaining as the "determining" and "deciding". In addition, the "determining" and "deciding" may include one regarding "receiving" (for example, receiving information), transmitting (for example, transmitting information), an input, an output, accessing (for example, accessing data in memory) as "determining" and "deciding". In addition, the "determining" and "deciding" may include ones regarding ones such as resolving, selecting, choosing, establishing, and comparing as "determining" and "deciding". That is, the "determining" and "deciding" can include considering some operation as performing the "deciding" and "deciding". In addition, the "determining (deciding)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100 gNB
110 O-DU
111 Communication unit
113 Acquisition unit
115 Notification unit
117 Control unit
120 O-RU
121 Communication unit
123 Acquisition unit
125 Notification unit
127 Control unit
130 Intermediate device (FHM)
130A O-RU
200 UE
300 NMS
310 Communication unit
330 Acquisition unit
350 Notification unit
370 Control unit
1001 Processor
1002 Memory
1003 Storage
1004 Communication device
1005 Input device
1006 Output device
1007 Bus

The invention claimed is:

1. A management node comprising:
a receiver that receives an Open Radio Access Network Radio Unit (O-RU) delay profile of an O-RU, provided on a fronthaul;
a processor that determines a window parameter used to specify at least one of a reception window and a transmission window used in an Open Radio Access Network Distributed Unit (O-DU) provided on the fronthaul, based on the O-RU delay profile and a delay parameter between the O-RU and the O-DU defined in the fronthaul; and
a transmitter that transmits the window parameter to the O-DU,
wherein the window parameter includes a maximum value and a minimum value, and a difference between the maximum value and the minimum value is used to determine the reception window or the transmission window.

2. The management node according to claim 1, wherein the O-RU delay profile includes at least one of a parameter for determining the reception window related to a delay from radio reception at an antenna of the O-RU to output at a port of the O-RU, and a parameter for determining the transmission window related to a delay from reception at a port of the O-RU to radio transmission at an antenna of the O-RU.

3. The management node according to claim 1, wherein the delay parameter includes a parameter related to a delay between the O-RU and the O-DU.

4. The management node according to claim 1, wherein the window parameter includes at least one of a parameter defining the reception window and a parameter defining the transmission window.

5. An Open Radio Access Network Distributed Unit (O-DU) provided on a fronthaul, comprising:
- a receiver that receives a window parameter from a management node; and
- a processor that configures at least one of a reception window and a transmission window based on the window parameter,
- wherein the window parameter is determined at the management node based on an O-RU delay profile of an Open Radio Access Network Radio Unit (O-RU) provided on the fronthaul and a delay parameter between the O-DU and the O-RU defined in the fronthaul, and
- wherein the window parameter includes a maximum value and a minimum value, and a difference between the maximum value and the minimum value is used to determine the reception window or the transmission window.

6. A radio communication system comprising:
- an Open Radio Access Network Radio Unit (O-RU) provided on a fronthaul;
- an Open Radio Access Network Distributed Unit (O-DU) provided on the fronthaul; and
- a management node, wherein the management node comprises
- a receiver that receives an O-RU delay profile of the O-RU;
- a processor that determines a window parameter used to specify at least one of a reception window and a transmission window used in the O-DU, based on the O-RU delay profile and a delay parameter between the O-DU and the O-RU defined in the fronthaul; and
- a transmitter that transmits the window parameter to the O-DU,
- wherein the window parameter includes a maximum value and a minimum value, and a difference between the maximum value and the minimum value is used to determine the reception window or the transmission window.

7. A radio communication method comprising:

receiving an Open Radio Access Network Radio Unit (O-RU) delay profile of an O-RU provided on a fronthaul;

determining a window parameter used to specify at least one of a reception window and a transmission window used in an Open Radio Access Network Distributed Unit (O-DU) provided on the fronthaul, based on the O-RU delay profile and a delay parameter between the O-DU and the O-RU defined in the fronthaul; and transmitting the window parameter to the O-DU, wherein the window parameter includes a maximum value and a minimum value, and a difference between the maximum value and the minimum value is used to determine the reception window or the transmission window.

* * * * *